(12) United States Patent
Yang

(10) Patent No.: US 11,689,035 B2
(45) Date of Patent: Jun. 27, 2023

(54) WIRELESS CHARGER WITH FAN

(71) Applicant: GUANGDONG OPPO MOBILE TELECOMMUNICATIONS CORP., LTD., Guangdong (CN)

(72) Inventor: Jun Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 278 days.

(21) Appl. No.: 17/148,331

(22) Filed: Jan. 13, 2021

(65) Prior Publication Data
US 2021/0218256 A1 Jul. 15, 2021

(30) Foreign Application Priority Data

Jan. 14, 2020 (CN) .......................... 202010037378.4
Jan. 14, 2020 (CN) .......................... 202020074708.2

(51) Int. Cl.
| | | |
|---|---|---|
| H01M 10/46 | (2006.01) | |
| H02J 7/00 | (2006.01) | |
| H02J 50/10 | (2016.01) | |
| H02J 50/00 | (2016.01) | |
| H01F 27/08 | (2006.01) | |
| H01F 38/14 | (2006.01) | |

(52) U.S. Cl.
CPC .......... *H02J 7/0042* (2013.01); *H01F 27/085* (2013.01); *H01F 38/14* (2013.01); *H02J 50/005* (2020.01); *H02J 50/10* (2016.02)

(58) Field of Classification Search
CPC ...... H02J 7/0042; H02J 7/0044; H02J 50/005; H02J 50/10; H02J 7/00309; H01F 38/14; H01F 27/085

USPC .......................... 320/107, 108, 114, 115, 150
See application file for complete search history.

(56) References Cited

FOREIGN PATENT DOCUMENTS

| | | |
|---|---|---|
| CN | 207166199 U | 3/2018 |
| CN | 107947384 A | 4/2018 |
| CN | 209627009 U | 11/2019 |
| CN | 209627022 U | 11/2019 |
| DE | 102016216900 B3 | 10/2017 |
| EP | 3694301 A1 | 8/2020 |

(Continued)

OTHER PUBLICATIONS

Translation of CN209627022U (Year: 2019).*

(Continued)

*Primary Examiner* — Edward Tso
(74) *Attorney, Agent, or Firm* — Young Basile Hanlon & MacFarlane, P.C.

(57) ABSTRACT

A wireless charger is provided. The wireless charger includes a housing, a baffle, a coil module, a circuit board, and a fan. The housing defines a mounting cavity, a first vent, and a second vent. The baffle is disposed in the mounting cavity and divides the mounting cavity into a first chamber and a second chamber. The coil module is disposed in the second chamber. The circuit board is disposed in the mounting cavity and electrically connected to the coil module. The fan, disposed in the first chamber and configured to guide air to flow into the first chamber from one of the first vent and the second vent and guide the air to flow out of the first chamber from the other of the first vent and the second vent, such that the air at the second vent exchanges heat with the electronic device.

19 Claims, 6 Drawing Sheets

(56) References Cited

FOREIGN PATENT DOCUMENTS

WO      2019085839 A1    5/2019
WO      2019101621 A1    5/2019

OTHER PUBLICATIONS

Extended European Search Report for EP Application 21151353.6 dated May 18, 2021. (8 pages).
Indian Examination Report for IN Application 202114001554 dated Aug. 17, 2021. (5 pages).

* cited by examiner

WIRELESS CHARGER WITH FAN

CROSS-REFERENCE TO RELATED APPLICATION(S)

This application claims priorities to Chinese Patent Application No. 202010037378.4 filed on Jan. 14, 2020, and Chinese Patent Application No. 202020074708.2, filed on Jan. 14, 2020, the contents of which are herein incorporated by reference in their entireties.

TECHNICAL FIELD

The described embodiments relate to the field of chargers.

BACKGROUND

Wireless chargers may be configured to charge electronic devices such as mobile terminals. The wireless chargers may be divided into two categories: vertical wireless chargers and horizontal wireless chargers. For the vertical wireless chargers, the electronic devices are generally obliquely placed on the wireless chargers during the charging. Since coils of the wireless chargers are relatively fixed in designed positions, the vertical wireless chargers may adapt to relatively limited models. For the horizontal wireless chargers, the electronic devices are generally rested flat on the wireless chargers during charging. Heat-dissipation air channels of the horizontal wireless chargers are more complicated and the heat dissipation effect is poor.

SUMMARY

In some embodiments of the present disclosure, a wireless charger is provided, and the wireless charger may adapt to different types of electronic devices and may have a better heat dissipation effect.

In some aspects, a wireless charger is provided. The wireless charger comprises: a housing, defining a mounting cavity, a first vent, and a second vent, wherein the housing is configured to hold an electronic device with the second vent facing the electronic device; a baffle, disposed in the mounting cavity and dividing the mounting cavity into a first chamber and a second chamber, wherein both the first vent and the second vent are fluidly coupled to the first chamber; a coil module, disposed in the second chamber; a circuit board, disposed in the mounting cavity and electrically connected to the coil module; and a fan, disposed in the first chamber and configured to guide air to flow into the first chamber from one of the first vent and the second vent and guide the air to flow out of the first chamber from the other of the first vent and the second vent, such that the air at the second vent exchanges heat with the electronic device.

In some aspects, a wireless charger is provided. The wireless charger includes: a housing, defining a mounting cavity, a first vent, and a second vent, wherein the housing is configured to hold an electronic device with the second vent facing the electronic device; the first vent penetrates through the housing along a first direction, the second vent penetrates through the housing along a second direction, and the first direction is inclined to or substantially perpendicular to the second direction; a baffle, disposed in the mounting cavity and dividing the mounting cavity into a first chamber and a second chamber, wherein both the first vent and second vent are fluidly coupled to the first chamber; and a fan, disposed in the first chamber and configured to guide air to flow into the first chamber from one of the first vent and the second vent and guide the air to flow out of the first chamber from the other of the first vent and the second vent, such that the air at the second vent exchanges heat with the electronic device.

In some aspects, a wireless charger is provided. The wireless charger includes: a lower shell, defining a first vent; an upper shell, defining a second vent, connected to the lower shell, and cooperatively defining a mounting cavity with the lower shell; wherein the upper shell comprises a recessed portion configured to hold an electronic device with the second vent facing the electronic device, and the first vent is shielded by the upper shell in a thickness direction of the wireless charger; a baffle, disposed in the mounting cavity and dividing the mounting cavity into a first chamber and a second chamber, wherein both the first vent and second vent are fluidly coupled to the first chamber; a coil module, disposed in the second chamber; a circuit board, disposed in the second chamber and electrically connected to the coil module; a plurality of electronic components, arranged on the circuit board at one side away from the coil module; and a fan, disposed in the first chamber and configured to guide air to flow into the first chamber from one of the first vent and the second vent and guide the air to flow out of the first chamber from the other of the first vent and the second vent.

BRIEF DESCRIPTION OF DRAWINGS

In order to more clearly describe technical solutions in some embodiments of the present disclosure or the related art, the following will briefly introduce the drawings that are used in the description of some embodiments or the related art. Apparently, the drawings in the following description are only some embodiments of the present disclosure. For those skilled in the art, other drawings may be acquired based on these drawings without creative work.

DETAILED DESCRIPTION

Figure 1:
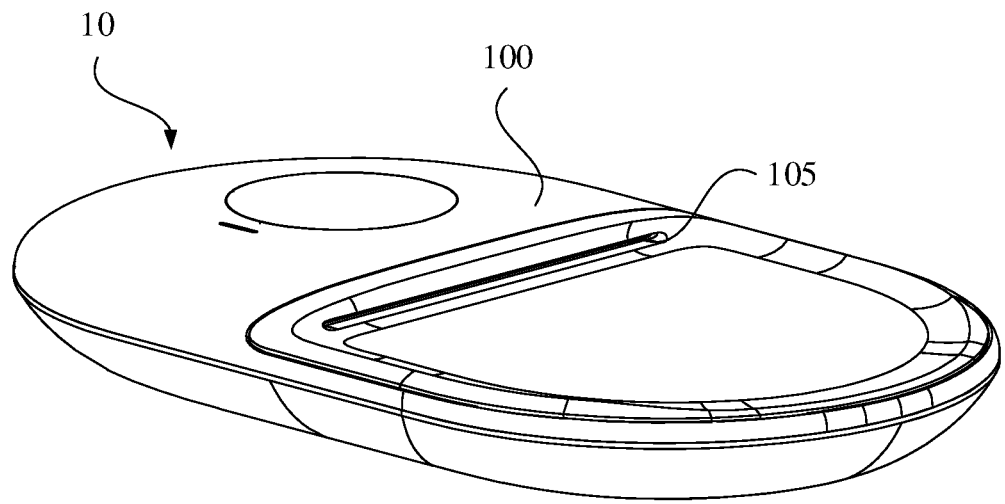
FIG. 1 is a schematic view of a wireless charger according to some embodiments of the present disclosure.

For better understanding of the present disclosure, the present disclosure will be described in a more comprehensive manner with reference to the relevant drawings. The drawings show some embodiments of the present disclosure. However, the present disclosure may be implemented in many different forms and is not limited to the embodiments described herein. On the contrary, the purpose of providing these embodiments is to make the present disclosure be understood more thoroughly and comprehensively.

In some aspects, a wireless charger is provided. The wireless charger includes: a housing, defining a mounting cavity, a first vent, and a second vent, wherein the housing is configured to hold an electronic device with the second vent facing the electronic device; a baffle, disposed in the mounting cavity and dividing the mounting cavity into a first chamber and a second chamber, wherein both the first vent and the second vent are fluidly coupled to the first chamber; a coil module, disposed in the second chamber; a circuit board, disposed in the mounting cavity and electrically connected to the coil module; and a fan, disposed in the first chamber and configured to guide air to flow into the first chamber from one of the first vent and the second vent and guide the air to flow out of the first chamber from the other of the first vent and the second vent, such that the air at the second vent exchanges heat with the electronic device.

In some embodiments, the fan has: a third vent, fluidly coupled to the first chamber and isolated from the second chamber by the baffle; and a fourth vent, fluidly coupled to the second vent and isolated from the second chamber. The fan is configured to guide the air to flow in the fan from one of the third vent and the fourth vent, and further guide the air to flow out of the fan from the other of the third vent and the fourth vent.

In some embodiments, the fan has a third vent and a fourth vent, and the housing defines a fifth vent fluidly coupled to the second chamber. The third vent is fluidly coupled to the first chamber and is isolated from the second chamber by the baffle, the fourth vent is fluidly coupled to the second chamber. The fan is further configured to guide the air to flow in the fan from one of the third vent and the fourth vent, and further guide the air to flow out of the fan from the other of the third vent and the fourth vent, and the fan is further configured to guide the air to flow in the mounting cavity from one of the first vent and the fifth vent and guide the air to flow out of the mounting cavity from the other of the first vent and the fifth vent.

In some embodiments, the wireless charger comprises a plurality of electronic components, and the plurality of electronic components are arranged on the circuit board at one side away from the coil module.

In some embodiments, the circuit board is completely received in the second chamber.

In some embodiments, the wireless charger comprises a magnetic isolation member arranged in the second chamber, and the coil module is stacked on the magnetic isolation member.

In some embodiments, a distance between a surface of the circuit board facing the coil module and a surface of the magnetic isolation member away from the coil module is greater than or equal to 3 mm.

In some embodiments, a heat conductor is disposed at the side of the circuit board facing away from the coil module, and the heat conductor is configured to conduct heat generated by the circuit board to the housing.

In some embodiments, the wireless charger comprises a bracket connected to the housing, and the magnetic isolation member is connected to the bracket.

In some embodiments, the housing comprises an upper shell and a lower shell, and the upper shell is connected to the lower shell to cooperatively define the mounting cavity; the first vent is defined in the lower shell, the second vent is defined in the upper shell, an orthographic projection of the first vent projected on a datum plane is located in an orthographic projection of the upper shell projected on the datum plane, and the datum plane is a geometric plane substantially perpendicular to a thickness direction of the wireless charger.

In some embodiments, in the thickness direction of the wireless charger, a cross-sectional area of a region enclosed by an outer contour of the lower shell gradually decreases from one end close to the upper shell to an end away from the upper shell.

In some embodiments, a boss is arranged at one side of the lower shell at which the first vent is defined, the first vent is defined along an outer periphery of the boss, and one side of the boss facing away the upper shell protrudes out of the first vent.

In some embodiments, the wireless charger comprises a gasket, and the gasket is arranged at one side of the boss facing away from the upper shell outside the lower shell and further disposed around the outer periphery of the boss.

In some embodiments, the upper shell comprises a shell body and a pad, the shell body defines a first recessed portion covering the coil module, the pad is arranged in the first recessed portion, and the second vent extends from the first chamber to the first recessed portion.

In some embodiments, the pad covers the first recessed portion and the pad further has a second recessed portion; the second vent is fluidly coupled to the second recessed portion and the first chamber, and the electronic device is able to be disposed on the pad for wireless charging.

In some embodiments, the second recessed portion extends to one end of the pad away from the second vent.

In some embodiments, a rotation axis of the fan is substantially parallel to a thickness direction of the housing. An orthographic projection of the fan projected on a reference plane and an orthographic projection of the coil module projected on the reference plane are spaced apart from each other, and the reference plane is a geometric plane substantially perpendicular to the thickness direction of the housing.

In some embodiments, a thickness direction of the coil module is substantially parallel to a thickness direction of the circuit board; or the thickness direction of the coil module is substantially perpendicular to the thickness direction of the circuit board, and the circuit board is offset from the coil module in a horizontal direction substantially perpendicular to the thickness direction of the wireless charger.

In some aspects, a wireless charger is provided. The wireless charger includes: a housing, defining a mounting cavity, a first vent, and a second vent, wherein the housing is configured to hold an electronic device with the second vent facing the electronic device; the first vent penetrates through the housing along a first direction, the second vent penetrates through the housing along a second direction, and the first direction is inclined to or substantially perpendicular to the second direction; a baffle, disposed in the mounting cavity and dividing the mounting cavity into a first chamber and a second chamber, wherein both the first vent and second vent are fluidly coupled to the first chamber; and a fan, disposed in the first chamber and configured to guide air to flow into the first chamber from one of the first vent and the second vent and guide the air to flow out of the first chamber from the other of the first vent and the second vent, such that the air at the second vent exchanges heat with the electronic device.

In some aspects, a wireless charger is provided. The wireless charger includes: a lower shell, defining a first vent; an upper shell, defining a second vent, connected to the lower shell, and cooperatively defining a mounting cavity with the lower shell; wherein the upper shell comprises a recessed portion configured to hold an electronic device with the second vent facing the electronic device, and the first vent is shielded by the upper shell in a thickness direction of the wireless charger; a baffle, disposed in the mounting cavity and dividing the mounting cavity into a first chamber and a second chamber, wherein both the first vent and second vent are fluidly coupled to the first chamber; a coil module, disposed in the second chamber; a circuit board, disposed in the second chamber and electrically connected to the coil module; a plurality of electronic components, arranged on the circuit board at one side away from the coil module; and a fan, disposed in the first chamber and configured to guide air to flow into the first chamber from one of the first vent and the second vent and guide the air to flow out of the first chamber from the other of the first vent and the second vent.

Figure 2:
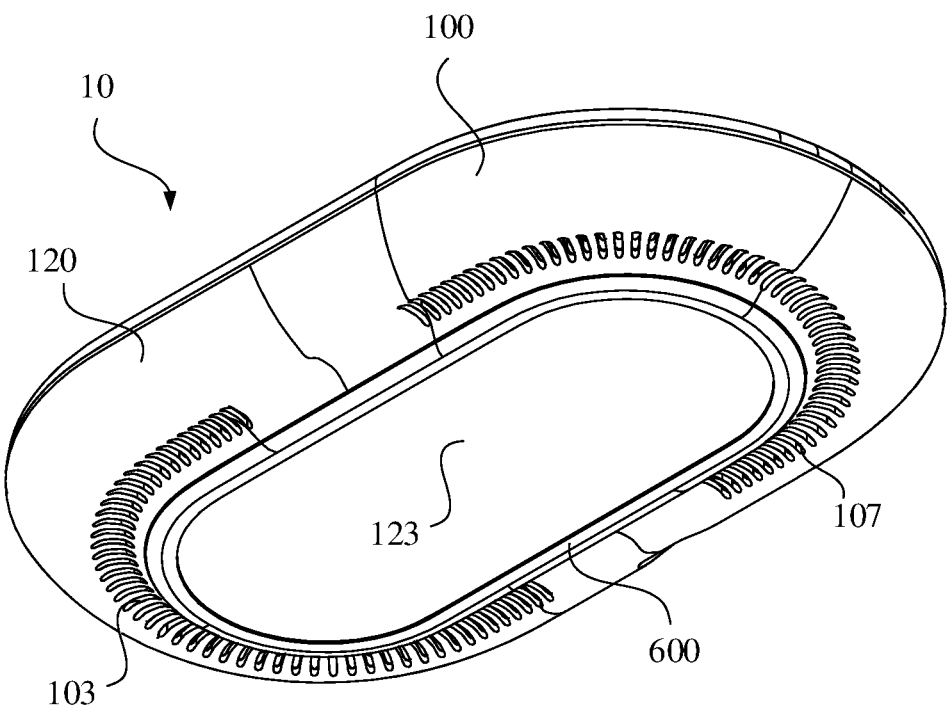
FIG. 2 is a schematic view of the wireless charger shown in FIG. 1 viewed from another perspective.
Figure 3:
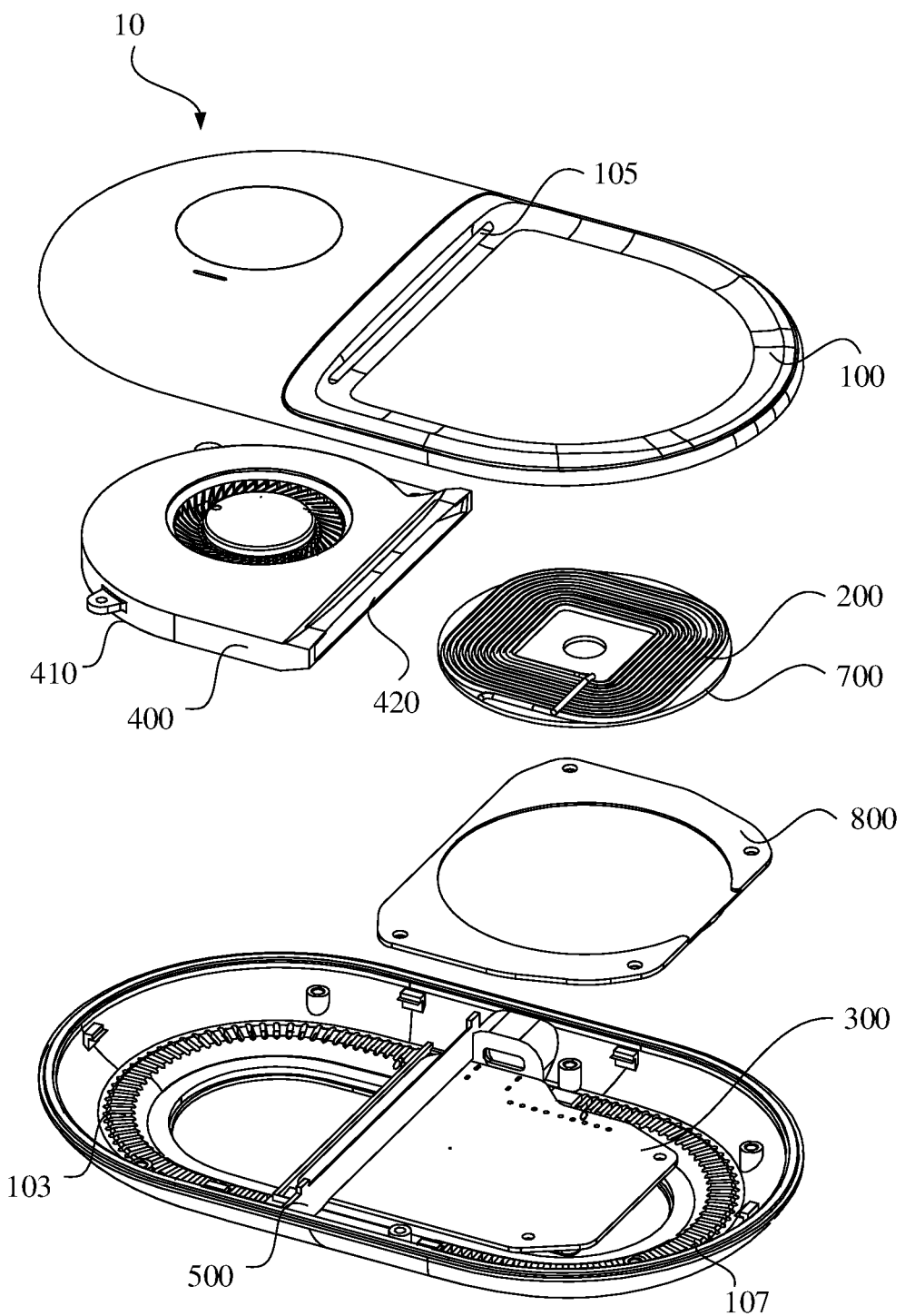
FIG. 3 is an exploded view of the wireless charger shown in FIG. 1.
Figure 4:
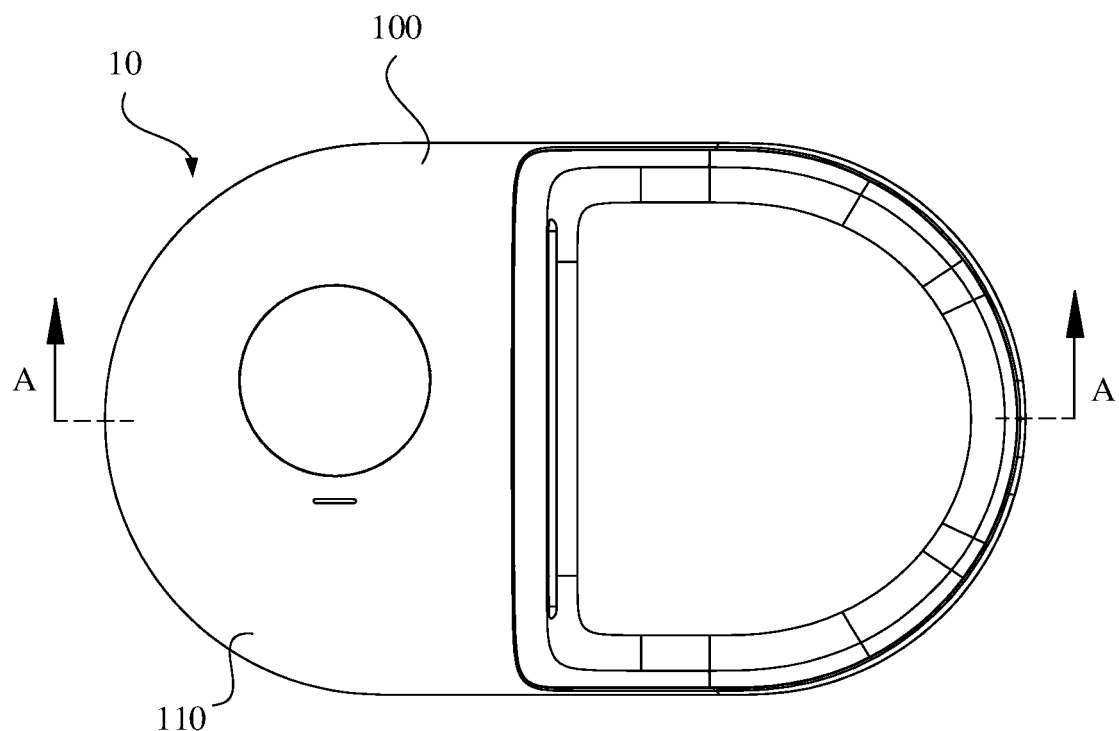
FIG. 4 is a top view of the wireless charger shown in FIG. 1.
Figure 5:
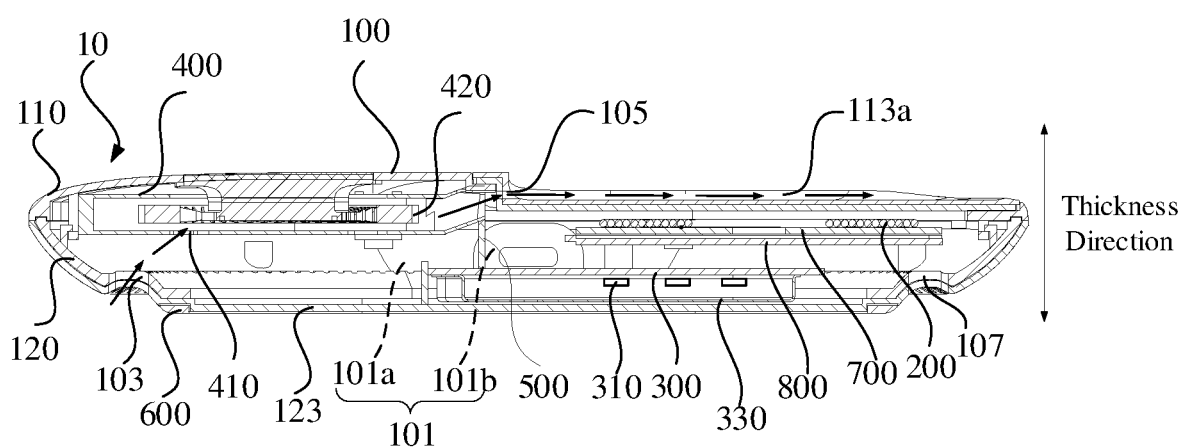
FIG. 5 is a cross-sectional view of the wireless charger along line A-A shown in FIG. 4.
Figure 6:
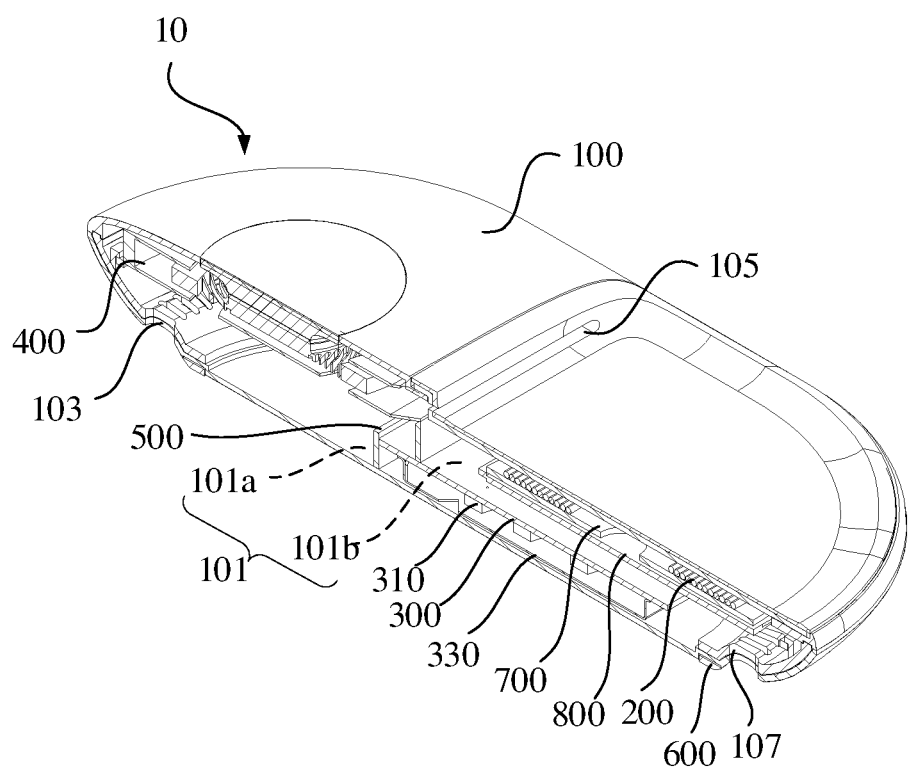
FIG. 6 is a cross-sectional perspective view of the wireless charger shown in FIG. 5 viewed from another perspective.

As shown in FIG. 1, FIG. 2, and FIG. 3, the wireless charger 10 may include a housing 100, a coil module 200, a circuit board 300, a fan 400, and a baffle 500. The coil module 200, the circuit board 300, and the fan 400 may be respectively disposed in the housing 100 and supported and positioned by the housing 100. The housing 100 may define a mounting cavity 101 (see FIG. 5), a first vent 103, and a second vent 105. The housing 100 may be configured to hold an electronic device having a wireless charging function, such that it is possible to use the wireless charger 10 to wirelessly charge the electronic device, and the second vent 105 may face the electronic device. As shown in FIG. 4, FIG. 5 and FIG. 6 at the same time, the baffle 500 may be disposed in the mounting cavity 101 and divide the mounting cavity 101 into a first chamber 101a and a second chamber 101b. Both the first vent 103 and the second vent 105 may be respectively fluidly connected to or fluidly coupled to the first chamber 101a. In some embodiments, the baffle 500 may completely separate or isolate the first chamber 101a from the second chamber 101b, that is, the first chamber 101a may not be fluidly connected to or fluidly coupled to the second chamber 101b. In other embodiments, the baffle 500 may define a through hole in a partial position to enable the first chamber 101a to be partially fluidly coupled to the second chamber 101b. The through hole may be further configured for a circuit-connecting line or the like to pass therethrough.

As shown in FIGS. 5 and 6, the coil module 200 may be disposed in the second chamber 101b, and the circuit board 300 may be disposed in the mounting cavity 101 and may be electrically connected to the coil module 200. More specifically, the circuit board 300 may be completely located in the second chamber 101b. Or in some embodiments, the circuit board 300 may be partially located in the second chamber 101b. Of course, the circuit board 300 may also be completely located in the first chamber 101a. The fan 400 may be disposed in the first chamber 101a. The fan 400 may be configured to guide ambient air or the air outside the wireless charger 10 to flow into the first chamber 101a via one of the first vent 103 and the second vent 105, and further guide the air to flow out of the first chamber 101a via the other of the first vent 103 and second vent 105. In this way, the air near the second vent 105 may exchange heat with the electronic device. More specifically, in some embodiments of the present disclosure, the fan 400 may guide the air to flow into the first chamber 101a from the first vent 103, and guide the air to flow out of the first chamber 101a via the second vent 105 and further flow to the electronic device, so as to exchange heat with the air in space near the electronic device. In other embodiments, the fan 400 may guide the air in the space near the electronic device to flow into the first chamber 101a from the second vent 105, and guide the air to flow out of the wireless charger 10 from the first vent 103. In this way, it may also dissipate the heat of the electronic device during the wireless charging process, thereby improving the heat dissipation performance of the wireless charger 10.

In some embodiments, the first vent 103 penetrates through the housing 100 along a first direction, the second vent 105 penetrates through the housing 100 along a second direction, and the first direction is inclined to or substantially perpendicular to the second direction. In some embodiments, the first direction may be substantially parallel to the thickness direction of the wireless charger, and the second direction may be substantially perpendicular to the first direction. However, the extension directions of the first vent 103 and the second vent 105 may not be limited thereto.

In some embodiments, the housing 100 may be substantially in shape of an ellipse, the fan 400 may be a centrifugal fan 400, and a rotation axis of the fan 400 may be substantially parallel to a thickness direction of the housing 100. The arrangement of the centrifugal fan 400 may facilitate a lightweight and thin design of the wireless charger 10. Furthermore, a geometric plane substantially perpendicular to the thickness direction of the housing 100 may be made or drawn, and the geometric plane may be used as a reference plane. An orthographic projection of the fan 400 projected on the reference plane and an orthographic projection of the coil module 200 projected on the reference plane may be spaced apart from each other, as shown in FIG. 5. In this way, it is possible to reduce the probability that the fan 400 is stacked on the coil module 200, and facilitate the lightweight and thin design of the wireless charger 10. Of course, in other embodiments, the housing 100 may have other shapes, such as a rounded rectangle, a racetrack shape, or the like. In some embodiments, the racetrack shape may refer to a shape formed by connecting two semicircular arcs with two opposite edges of a rectangle.

Figure 7:
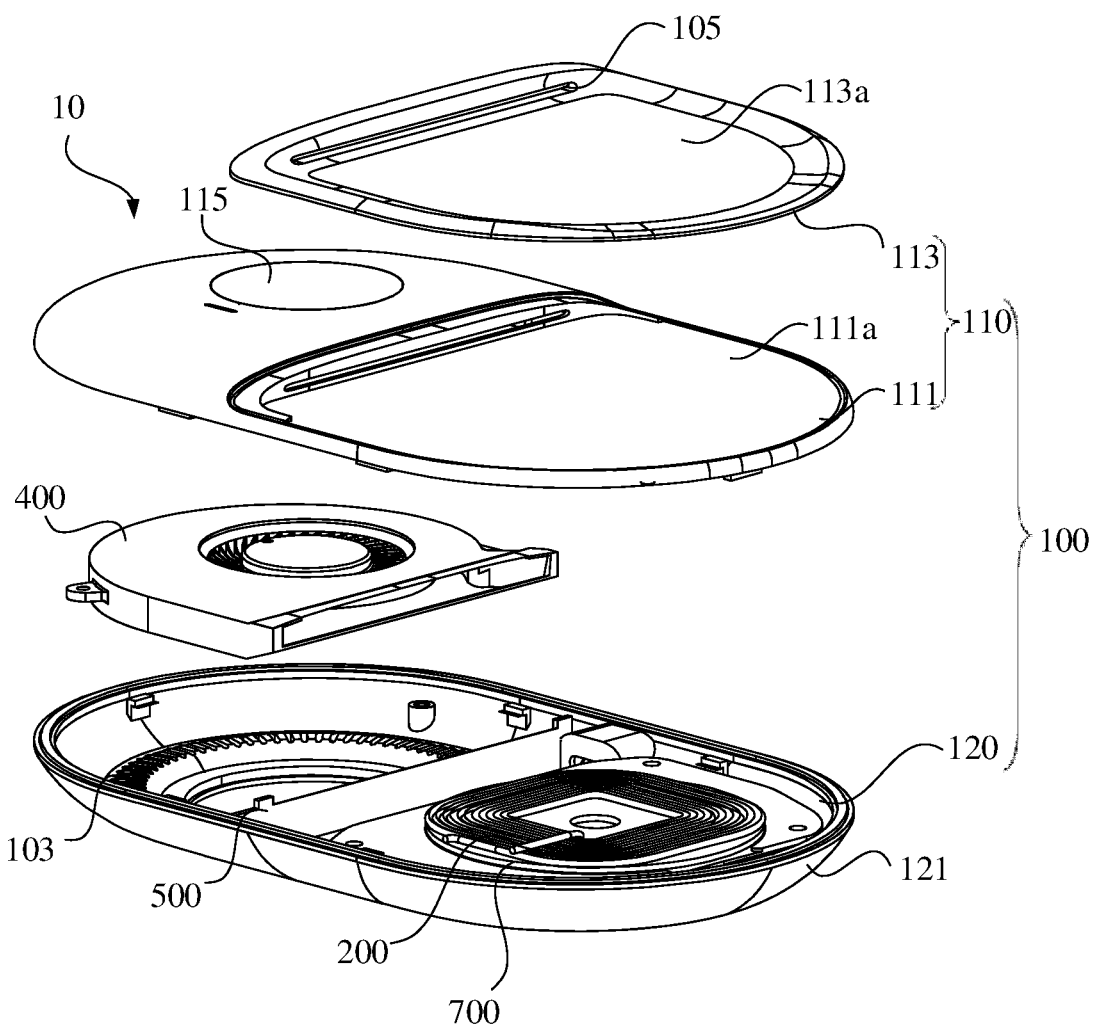
FIG. 7 is another exploded view of the wireless charger shown in FIG. 1.

As shown in FIG. 7, the housing 100 may include an upper shell 110 and a lower shell 120. The upper shell 110 may be connected to the lower shell 120 to define the mounting cavity 101. In some embodiments, the upper shell 110 may be substantially in shape of a plate, and a main part of the mounting cavity 101 may be defined in the lower shell 120. More specifically, as shown in FIG. 7, the lower shell 120 may have a side wall 121. The side wall 121 may be connected to the upper shell 110, and thus the upper shell 110 and the lower shell 120 may cooperatively define the mounting cavity 101. The first vent 103 may be defined in the lower shell 120, and the second vent 105 may be defined in the upper shell 110. In other embodiments, the lower shell 120 may also be in shape of a plate, and the side wall 121 may be located on the upper shell 110. The fan 400 may be disposed in the upper shell 110 or the lower shell 120. More specifically, the fan 400 may be connected to the upper shell 110 or the lower shell 120 by screwing, welding, bonding, or the like. Furthermore, in some embodiments, the lower shell 120 may be made of a metal material such as aluminum alloy, magnesium alloy, stainless steel, or the like. The lower shell 120 made of metal may facilitate the heat dissipation of the housing 100. For example, parts of the heat in the mounting cavity 101 may be dissipated into the ambience through the lower shell 120 to improve the heat dissipation performance of the wireless charger 10. Of course, in other embodiments, the lower shell 120 may also be made of non-metallic material. The baffle 500 may be fixedly connected to the upper shell 110 or the lower shell 120 by welding, bonding, screwing, or the like. Of course, the baffle 500 may also be integrated with the upper shell 110, or the baffle 500 may also be integrated with the lower shell 120.

Furthermore, in some embodiments of the present disclosure, the lower shell 120 may have an electrical interface disposed therein, and the electrical interface may be electrically connected to the circuit board 300. The electrical interface may be configured to connect to an external power source to supply power to the wireless charger 10, thereby enabling the wireless charger 10 to charge the electronic device. The electrical interface may be a USB (Universal Serial Bus) interface, a cable with a plug, or the like. Of course, in other embodiments, the electrical interface may also be located in the upper shell 110. Furthermore, an indicator light may be arranged in the upper shell 110 or the lower shell 120 of the housing 100. The indicator light may be configured to prompt a working status of the wireless charger 10.

Furthermore, as shown in FIGS. 4 and 5, an orthographic projection of the first vent 103 projected on a datum plane may be located in an orthographic projection of the upper shell 110 projected on the datum plane. The datum plane may be the geometric plane substantially perpendicular to the thickness direction of the wireless charger 10. That is to say, when the user faces a top of the wireless charger 10, the first vent 103 may be covered or shielded by the upper shell 110 and may be not visible. With this arrangement of the first vent 103, when the wireless charger 10 is placed on a flat support such as a desktop, if the user faces the upper shell 110 in the thickness direction of the wireless charger 10, the first vent 103 may be shielded by the housing 100. In this way, it is possible to reduce the risk that foreign matters such as water or dust easily enter the wireless charger 10, thereby improving waterproof and dustproof performance of the wireless charger 10.

Figure 8:
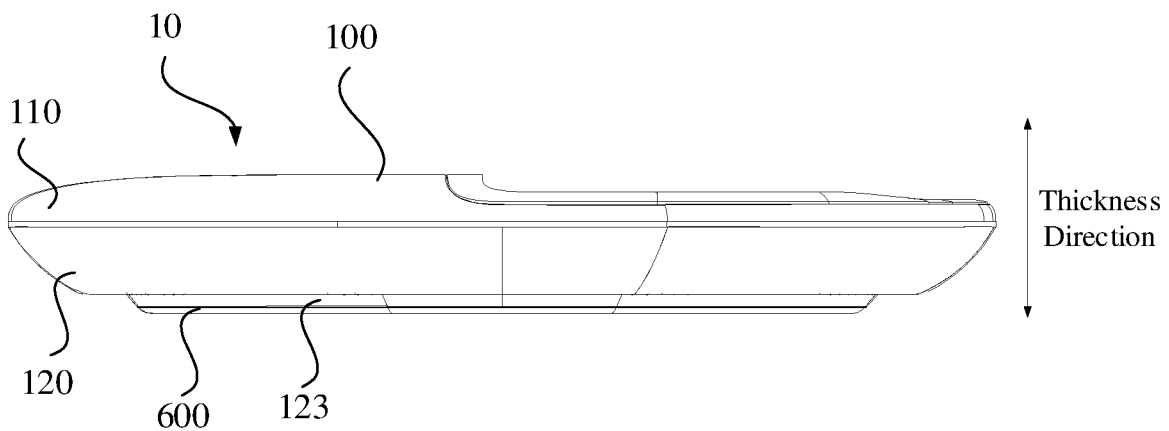
FIG. 8 is a front view of the wireless charger shown in FIG. 1.

Furthermore, combining with FIG. 8, in the thickness direction of the wireless charger 10, a cross-sectional area of a part of the lower shell 120 may gradually decrease from one end close to the upper shell 110 to an end away from the upper shell 110, that is to say, a cross-sectional area of a region enclosed by an outer contour of the lower shell 120 or the side wall 121 may gradually decrease from one end close to the upper shell 110 to an end away from the upper shell 110. That is, in the thickness direction of the wireless charger 10, the wireless charger 10 may have a configuration having an upper end larger than a lower end. Herein, "the upper end being larger than the lower end" means that a size of the upper end is greater than that of the lower end. This structural arrangement may improve an appearance characteristics of the wireless charger 10, and may use the larger upper end of the housing 100 to shield the first vent 103. Of course, in other embodiments, the housing 100 may also be in the shape of a rectangular block, that is, the cross-sectional area of the housing 100 may be approximately equal in the thickness direction of the wireless charger 10. In this case, the first vent 103 may also be shielded by the upper shell 110 by arranging a step at a local position of the housing 100.

Furthermore, as shown in FIG. 5, when the wireless charger 10 is placed on the flat support such as a desktop, the first vent 103 may face a surface of the support. A boss 123 may be arranged at one side of the lower shell 120 at which the first vent 103 is defined. The first vent 103 may be defined along or surrounding an outer periphery of the boss 123. One side of the boss 123 facing away the upper shell 110 may protrude out of the first vent 103. In some embodiments, the side of the boss 123 facing away the upper shell 110 may be further located at a level lower than the first vent 103. More specifically, the boss 123 may be connected to the side wall 121 at one side of the side wall 121 away from the upper shell 110. The first vent 103 may be defined in the side wall 121 and further surround or defined around the outer periphery of the boss 123. The first vent 103 may be defined on a first bottom surface of the side wall 121, and the boss 123 may have a second bottom surface away from the upper shell 110 and further exposed outside. A distance between first bottom surface and the upper shell 110 is less than a distance between the second bottom surface and the upper shell 110, such that the first bottom surface is located at a level higher than the second bottom surface. This structure may facilitate the processing of the lower shell 120, and the first vent 103 may be better shielded by the upper shell 110 and an upper end of the lower shell 120. Besides, the boss 123 may effectively support the wireless charger 10, such that the wireless charger 10 may be stably placed on the support. Furthermore, combining with FIG. 2, in some embodiments of the present disclosure, the boss 123 may be substantially in shape of a racetrack. In other embodiments, the boss 123 may have other shapes such as a rectangle, a rounded rectangle, an ellipse, or the like.

Furthermore, the wireless charger 10 may include a gasket 600. The gasket 600 may be substantially annular and may match with the boss 123 in shape. For example, in some embodiments of the present disclosure, the gasket 600 may be substantially in shape of a racetrack. The gasket 600 may be arranged around the outer periphery of the boss 123 and protrude out of one side of the boss 123 facing away from the upper shell 110. That is, the gasket 600 may be disposed at one side of the boss 123 facing away from the upper shell 110 and further disposed outside the lower shell 120. The gasket 600 may be made of silicone, rubber, plastic, or the like. When the wireless charger 10 is placed on the support, the gasket 600 may be configured to increase a coefficient of friction between the lower shell 120 and the support, thereby reducing the possibility that the wireless charger 10 easily slides along on the support.

As shown in FIG. 7, the upper shell 110 may include a shell body 111 and a pad 113. The shell body 111 may have a first recessed portion 111a disposed corresponding to the coil module 200 and further covering the coil module 200. That is, the shell body 111 of the upper shell 110 may have a first side higher than the second side opposite to the first side. The lower side (second side) of the shell body 111 may be configured to hold the electronic device. The higher side (first side) of the shell body 111 of the upper shell 110 may be configured to dispose the fan 400 correspondingly. In this way, it is possible to improve a space utilization of the wireless charger 10. Furthermore, the upper shell 110 may include a decorative cover 115. A mounting hole may be defined at the slightly higher side (first side) of the shell body 111 of the upper shell 110. The decorative cover 115 may be disposed in the mounting hole. A pattern or the like may be arranged on an exposed surface of the decorative cover 115, in order to provide a better decorative effect to the wireless charger 10, thereby improving the appearance characteristics of the wireless charger 10. Herein, the exposed surface of the decorative cover 115 is exposed to the outside. Of course, it's understandable that, the decorative cover 115 may be not necessary.

Figure 9:
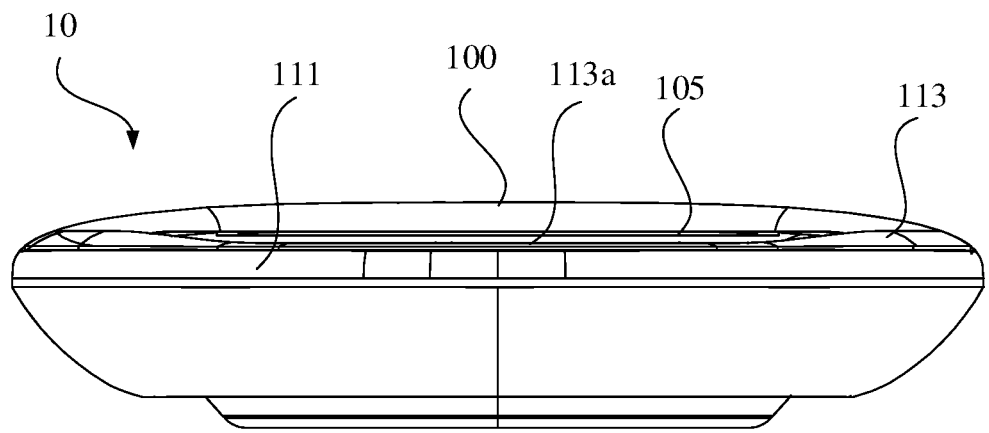
FIG. 9 is a right view of the wireless charger shown in FIG. 1.

The pad 113 may be disposed on the first recessed portion 111a. The second vent 105 may extend from the first chamber 101a to the first recessed portion 111a, such that the first chamber 101a may be fluidly coupled to the first recessed portion 111a via the second vent 105. Furthermore, the pad 113 may cover the first recessed portion 111a. The pad 113 may further have a second recessed portion 113a. The second recessed portion 113a may be fluidly coupled to the first chamber 101a via the second vent 105, and the electronic device may be placed on the pad 113 for wireless charging. More specifically, combining with FIG. 9, in some embodiments, the pad 113 may have a middle slightly lower than two sides thereof, in order to form the second recessed portion 113a. When placing the electronic device having a slightly larger size on the pad 113, the electronic device may be supported by the pad 113. The second recessed portion 113a may extend to one end of the pad 113 away from the second vent 105. The ambient air may flow relative to the air in the second recessed portion 113a and exchange heat with the electronic device, so as to improve the heat dissipation performance of the wireless charger 10. For example, in some embodiments in which the fan 400 guides the air to flow out of the second vent 105 and flow to the electronic device, the air after the heat exchange process may flow out from one end of the second recessed portion 113a away from the second vent 105, and thus the heat generated by the electronic device may be effectively dissipated into the air.

In some embodiments, the pad 113 may in shape of a sheet, and the shape of the pad 113 may match with a shape of a contour of the first recessed portion 111a. The pad 113 may be made of a flexible material such as silicone or rubber, and the pad 113 may be configured to support the electronic device. In this way, the electronic device may be placed in the second recessed portion 113a for wireless charging. The pad 113 may improve a heat-insulating property between the electronic device and the shell body 111, and reduce the possibility that the heat generated by the electronic device may be easily transferred to the shell body 111 of the upper shell 110. The arrangement of the pad 113 and the second recessed portion 113a may also enable the user to accurately place the electronic device on the upper shell 110 at the position corresponding to the coil module 200, thereby improving the convenience of use. Besides, the pad 113 may also reduce the possibility that the electronic device is scratched by the shell body 111 of the upper shell 110. In other embodiments, the pad 113 may have other shapes. For example, the pad 113 may be in shape of a strip and arranged at two opposite edges of the first recessed portion 111a, in order to support a large-sized electronic device for wireless charging and facilitate the heat dissipation of the electronic device. Of course, it may be understandable that the pad 113 may be not necessary.

For the electronic device such as a smart phone and a tablet compute having a wireless charging function and a larger size, when the electronic device is placed on the upper shell 110 for charging, the pad 113 may be configured to support the electronic device. A gas channel may be defined or formed between the electronic device and the pad 113 through the second recessed portion 113a. With reference to FIG. 5, during the wireless charging of the electronic device, the fan 400 may guide the air to flow into the gas channel via the second vent 105. The air may further flow through the second recessed portion 113a for heat exchange, and may be further flow out from one end of the second recessed portion 113a away from the second vent 105, thereby improving the heat dissipation efficiency of the wireless charger 10.

For the electronic device having the wireless charging function and a smaller size, such as a smart watch, a wireless earphone, or the like, when the electronic device is placed on the upper shell 110 for charging, the electronic device may be placed in the second recessed portion 113a and contact with an outer surface of the pad 113. A gas channel may be formed or defined between an outer periphery of the electronic device and the pad 113. The fan 400 may guide the air to flow into the gas channel from the second vent 105. The air may flow around the outer periphery of the electronic device for heat exchange and may be further dissipated into the ambience. In this way, it may also possible to improve the heat dissipation efficiency of the wireless charger 10.

Furthermore, as shown in FIG. 3, the wireless charger 10 may include a magnetic isolation member 700 arranged in the second chamber 101b. In some embodiments, the magnetic isolation member 700 may be in shape of a sheet. The coil module 200 may be disposed and further stacked on the magnetic isolation member 700. The magnetic isolation member 700 may be made of ferrite wave-absorbing material, and may have excellent magnetic properties. The magnetic isolation member 700 may be configured to increase a magnetic flux of the coil module 200 and to reduce a loss of the coil module 200. In this way, magnetic field lines may be disposed tightly around a peripheral region centered on the magnetic isolation member 700, to increase an electromagnetic induction intensity and improve an electromagnetic conversion efficiency.

Furthermore, the wireless charger 10 may include a bracket 800 connected to the lower shell 120. The magnetic isolation member 700 may be disposed on the bracket 800 and supported by the bracket 800. In some embodiments, the bracket 800 may conduct the heat generated by the coil module 200 to the lower shell 120. During the wireless charging process of the electronic device, this arrangement may facilitate the conduction of the heat generated by the coil module 200 to the lower shell 120 made of metal, and the heat generated by the coil module 200 may be further dissipated to the ambient air through the lower shell 120. In some embodiments in which the lower shell 120 is made of the non-metallic material, the bracket 800 may also improve a stability of the mounting of the coil module 200 and the magnetic isolation member 700. Of course, the bracket 800 may also be connected to the upper shell 110 and supported and positioned by the upper shell 110.

Furthermore, in some embodiments of the present disclosure, the circuit board 300 may be completely received in the second chamber 101b and may be spaced apart from the magnetic isolation member 700. In some embodiments, the magnetic isolation member 700 may be arranged between the circuit board 300 and the coil module 200. The circuit board 300 may be fixedly connected to the lower shell 120 or the upper shell 110 by means of threaded connection, bonding, or the like, which will not be repeated here. Furthermore, in some embodiments of the present disclosure, the circuit board 300 may be substantially parallel to the coil module 200, that is, a thickness direction of the coil module 200 may be substantially parallel to a thickness direction of the circuit board 300. The wireless charger 10 may include a plurality of electronic components 310 disposed on the circuit board 300, such as a control chip, a resistor, a capacitor, or the like. The number of the plurality of electronic components 310 may be two or more. The plurality of electronic components 310 may be disposed on the circuit board 300 at one side facing away from the coil module 200. During the wireless charging process of the electronic device by the wireless charger 10, this arrangement may reduce an influence of the heat generated by the coil module 200 on the electronic components 310 of the circuit board 300, thereby improving the heat dissipation performance of the wireless charger 10. Furthermore, a distance between a surface of the circuit board 300 facing the coil module 200 and a surface of the magnetic isolation member 700 facing away from the coil module 200 may be greater than or equal to 3 mm. This arrangement may not only reduce the influence of the heat generated by the coil module 200 on the electronic components 310 of the circuit board 300, but also reduce the thickness of the wireless charger 10, which may facilitate the lightweight and thin design of the wireless charger 10. The heat dissipation performance of the wireless charger 10 may also be improved.

In other embodiments, the circuit board 300 may be arranged obliquely to the coil module 200. That is, the thickness direction of the circuit board 300 may be arranged at an acute angle from the thickness direction of the coil module 200. Of course, in other embodiments, the circuit board 300 may also be substantially perpendicular to the coil module 200. That is, the thickness direction of the circuit board 300 may be substantially perpendicular to the thickness direction of the coil module 200. In the embodiments in which the thickness direction of the circuit board 300 may be substantially perpendicular to the thickness direction of the coil module 200, an orthographic projection of the circuit board 300 protected in the thickness direction of the wireless charger 10 (also called as "protected in the datum plane") may better not fall into the coil module 200, in order to reduce the thickness of the wireless charger 10, and reduce the influence of the heat generated by the coil module 200 to the electronic components 310 on the circuit board 300. For example, in the embodiments in which the thickness direction of the circuit board 300 may be substantially perpendicular to the thickness direction of the coil module 200, the circuit board 300 may be offset from or misaligned with the coil module 20 in the horizontal direction. The horizontal direction may be substantially perpendicular to the thickness direction of the wireless charger. The plurality of electronic components 310 may also be arranged at one side of the circuit board 300 facing away from the coil module 200, in order to reduce the influence of the heat generated by the coil module 200 to the electronic components 310 on the circuit board 300.

Furthermore, in some embodiments, a heat conductor 330 may be disposed at one side of the circuit board 300 facing away from the coil module 200. The heat conductor 330 may be configured to conduct the heat generated by the circuit board 300 to the lower shell 120. More specifically, the heat conductor 330 may be made of silicone grease, may be a metal thermal-conductive sheet, or the like. The heat conductor 330 may be configured to conduct the heat generated by the circuit board 300 to the lower shell 120 made of metal, and then the heat generated by the circuit board 300 may be further dissipated into the ambient air through the lower shell 120. The heat dissipation performance of the wireless charger 10 may be further improved.

Furthermore, as shown in FIG. 5, in some embodiments, the fan 400 may define a third vent 410 and a fourth vent 420. The third vent 410 may be fluidly coupled to the first chamber 101a and may be isolated from the second chamber 101b by the baffle 500. The four vent 420 may be fluidly coupled to the second vent 105 and may be isolated from the second chamber 101b. The fan 400 may be configured to guide the air to flow in the fan 400 from one of the third vent 410 and the fourth vent 420 and guide the air to flow out of the fan 400 from the other of the third vent 410 and the fourth vent 420. In some embodiments, the housing 100 may define a fifth vent 107. The fifth vent 107 may be fluidly coupled to the second chamber 101b. The fifth vent 107 may have a configuration similar to that of the first vent 103 and may be arranged along or around the outer periphery of the boss 123. The fifth vent 107 may be fluidly coupled to the second chamber 101b and the outside, such that the air in the second chamber 101b may exchange heat with the ambient air, thereby improving the heat dissipation performance of the wireless charger 10. In some embodiments, the baffle 500 may reduce the possibility that hot air in the second chamber 101b may flow to the first chamber 101a and be further guided to the electronic device, thereby increasing the heat dissipation efficiency of the wireless charger 10.

Figure 10:
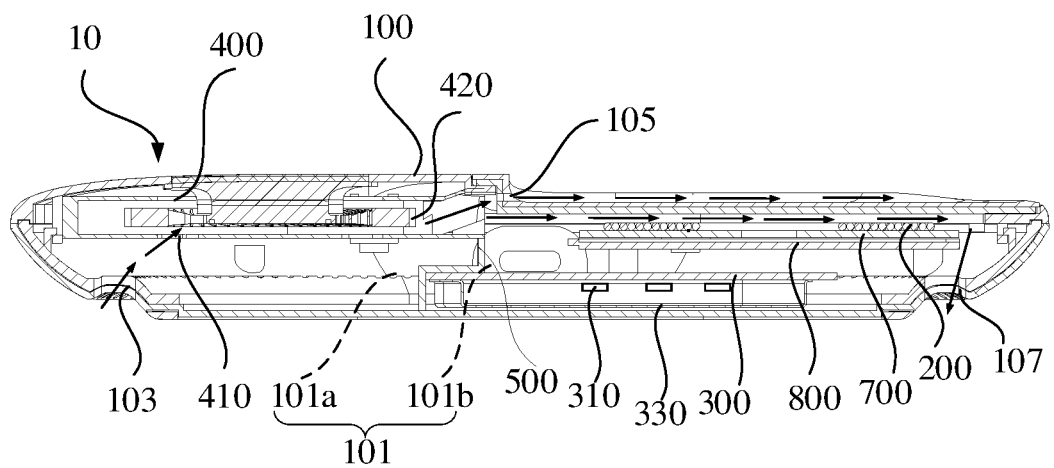
FIG. 10 is a cross-sectional view of a wireless charger according to some embodiments of the present disclosure.

As shown in FIG. 10, in other embodiments, the housing 100 may define the fifth vent 107 fluidly coupled to the second chamber 101b. The fifth vent 107 may have a configuration similar to that of the first vent 103 and may be arranged along or around the outer periphery of the boss 123. The third vent 410 may be fluidly coupled to the first chamber 101a and may be isolated from the second chamber 101b via the baffle 500. The fourth vent 420 may be fluidly coupled to the second chamber 101b and the fifth vent 107. In some embodiments in which the fan 400 guides the air to flow from the first chamber 101a to the second vent 105 and further flow out of the wireless charger 10 from the second vent 105, the air in the first chamber 101a may be guided into the second chamber 101b by the fan 400 and may exchange heat with the coil module 200 and the circuit board 300. The air after the heat exchange may further flow out of the wireless charger 10 via the fifth vent 107, in order to improve the heat dissipation performance of the wireless charger 10. Similarly, in some embodiments in which the fan 400 guides the air to flow into the first chamber 101a from the second vent 105 and flow out of the wireless charger 10 from the first vent 103, the ambient air may be guided into the second chamber 101b from the fifth vent 107 and may exchange heat with the coil module 200 and the circuit board 300. The air after the heat exchange may be further guided into the first chamber 101a by the fan 400, and then flow out of the wireless charger 10 from the first chamber 101a via the first vent 103, thereby improving the heat dissipation performance of the wireless charger 10. In some embodiments, the baffle 500 may reduce the possibility that the hot air in the second chamber 101b may enter the first chamber 101a and then flow back to the second chamber 101b, thereby improving the heat dissipation efficiency of the wireless charger 10.

For the above-mentioned wireless charger 10, the electronic device such as the smart phone, the smart watch, the wireless earphone, and other electronic devices with the wireless charging function may be placed in the charging region for wireless charging. The wireless charger 10 may be adapted to a variety of models, which improves the convenience of use. Since the wireless charger 10 includes the fan 400 and defines the first vent 103 and the second vent 105, during the wireless charging process of the electronic device, the fan 400 may cause the air around the electronic device to flow, so as to facilitate the heat dissipation of the electronic device. Since the fan 400 and the coil module 200 may be separated or spaced apart from each other in the first chamber 101a and the second chamber 101b by the baffle 500, in some embodiments in which the fan 400 guides the air to flow out of the wireless charger 10 from the second vent 105, the baffle 500 may reduce the possibility that the hot air in the second chamber 101b flows to the first chamber 101a and is further guided to the electronic device, thereby improving the heat dissipation efficiency of the wireless charger 10. In some embodiments in which the fan 400 guides the air to flow into the wireless charger 10 from the second vent 105, the baffle 500 may reduce the possibility that the hot air in the second chamber 101b flows back to the second chamber 101b, thereby improving the heat dissipation efficiency of the wireless charger 10. The heat-dissipation air channel of the wireless charger 10 may be easy to design, may have a better heat dissipation effect, and may meet the requirements of high-power wireless charging, and the wireless charging time may be shortened.

The technical features of the above-mentioned embodiments may be combined arbitrarily. For conciseness of description, all possible combinations of the technical features in the above-mentioned embodiments may be not described. However, all should be covered in the scope of the present disclosure, as long as there is no contradiction in the combination of these technical features.

The above-mentioned embodiments only describe some implementations of the present disclosure, and the description to the implementations may be specific and detailed, however, they should not be understood as a limitation to the scope of the present disclosure. It should be pointed out that, for those skilled in the art, several modifications and improvements may be made without departing from the concept of the present disclosure. All these fall within the protection scope of the present disclosure. Therefore, the protection scope of the present disclosure shall be subject to the appended claims.

What is claimed is:

1. A wireless charger, comprising:
   a housing, defining a mounting cavity, a first vent, and a second vent, wherein the housing is configured to hold an electronic device with the second vent facing the electronic device;
   a baffle, disposed in the mounting cavity and dividing the mounting cavity into a first chamber and a second chamber, wherein both the first vent and the second vent are fluidly coupled to the first chamber, the first chamber is fluidly coupled to the second chamber, and a part of the housing defining the second chamber defines another vent fluidly coupled to the second chamber;
   a coil module, disposed in the second chamber;
   a circuit board, disposed in the mounting cavity and electrically connected to the coil module, and
   a fan, disposed in the first chamber and configured to:
     guide air to flow into the first chamber from one of the first vent and the second vent and guide the air to flow out of the first chamber from the other of the first vent and the second vent, such that the air at the second vent exchanges heat with the electronic device; and
     guide the air to flow into the first chamber and the second chamber from one of the first vent and the other vent and guide the air to flow out of the mounting cavity from the other of the first vent and the other vent.

2. The wireless charger as claimed in claim 1, wherein the fan has a third vent and a fourth vent;
   wherein the third vent is fluidly coupled to the first chamber and is isolated from the second chamber by the baffle, the fourth vent is fluidly coupled to the second chamber; and
   wherein the fan is further configured to guide the air to flow in the fan from one of the third vent and the fourth vent, and further guide the air to flow out of the fan from the other of the third vent and the fourth vent.

3. The wireless charger as claimed in claim 1, wherein the wireless charger comprises a plurality of electronic components, and the plurality of electronic components are arranged on the circuit board at one side away from the coil module.

4. The wireless charger as claimed in claim 3, wherein the circuit board is completely received in the second chamber.

5. The wireless charger as claimed in claim 3, wherein the wireless charger comprises a magnetic isolation member arranged in the second chamber, and the coil module is stacked on the magnetic isolation member.

6. The wireless charger as claimed in claim 5, wherein a distance between a surface of the circuit board facing the coil module and a surface of the magnetic isolation member away from the coil module is greater than or equal to 3 mm.

7. The wireless charger as claimed in claim 6, wherein a heat conductor is disposed at the side of the circuit board facing away from the coil module, and the heat conductor is configured to conduct heat generated by the circuit board to the housing.

8. The wireless charger as claimed in claim 5, wherein the wireless charger comprises a bracket connected to the housing, and the magnetic isolation member is connected to the bracket.

9. The wireless charger as claimed in claim 1, wherein the housing comprises an upper shell and a lower shell, and the upper shell is connected to the lower shell to cooperatively define the mounting cavity;
   the first vent is defined in the lower shell, the second vent is defined in the upper shell, an orthographic projection of the first vent projected on a datum plane is located in an orthographic projection of the upper shell projected on the datum plane, and the datum plane is a geometric plane substantially perpendicular to a thickness direction of the wireless charger.

10. The wireless charger as claimed in claim 9, wherein in the thickness direction of the wireless charger, a cross-sectional area of a region enclosed by an outer contour of the lower shell gradually decreases from one end close to the upper shell to an end away from the upper shell.

11. The wireless charger as claimed in claim 9, wherein a boss is arranged at one side of the lower shell at which the first vent is defined, the first vent is defined along an outer periphery of the boss, and one side of the boss facing away the upper shell protrudes out of the first vent.

12. The wireless charger as claimed in claim 11, wherein the wireless charger comprises a gasket, and the gasket is arranged at one side of the boss facing away from the upper shell outside the lower shell and disposed around the outer periphery of the boss.

13. The wireless charger as claimed in claim 9, wherein the upper shell comprises a shell body and a pad, the shell body defines a first recessed portion covering the coil module, the pad is arranged in the first recessed portion, and the second vent extends from the first chamber to the first recessed portion.

14. The wireless charger as claimed in claim 13, wherein the pad covers the first recessed portion and the pad further has a second recessed portion;
   the second vent is fluidly coupled to the second recessed portion and the first chamber, and the electronic device is able to be disposed on the pad for wireless charging.

15. The wireless charger as claimed in claim 14, wherein the second recessed portion extends to one end of the pad away from the second vent.

16. The wireless charger as claimed in claim 1, wherein a rotation axis of the fan is substantially parallel to a thickness direction of the housing;
   an orthographic projection of the fan projected on a reference plane and an orthographic projection of the coil module projected on the reference plane are spaced apart from each other, and the reference plane is a geometric plane substantially perpendicular to the thickness direction of the housing.

17. The wireless charger as claimed in claim 1, wherein a thickness direction of the coil module is substantially parallel to a thickness direction of the circuit board; or
the thickness direction of the coil module is substantially perpendicular to the thickness direction of the circuit board, and the circuit board is offset from the coil module in a horizontal direction substantially perpendicular to the thickness direction of the wireless charger.

18. A wireless charger, comprising:
a housing, defining a mounting cavity, a first vent, and a second vent, wherein the housing is configured to hold an electronic device with the second vent facing the electronic device; the first vent penetrates through the housing along a first direction, the second vent penetrates through the housing along a second direction, and the first direction is inclined to or substantially perpendicular to the second direction;
a baffle, disposed in the mounting cavity and dividing the mounting cavity into a first chamber and a second chamber, wherein both the first vent and second vent are fluidly coupled to the first chamber, the first chamber is fluidly coupled to the second chamber, and a part of the housing defining the second chamber defines another vent fluidly coupled to the second chamber; and
a fan, disposed in the first chamber and configured to:
guide air to flow into the first chamber from one of the first vent and the second vent and guide the air to flow out of the first chamber from the other of the first vent and the second vent, such that the air at the second vent exchanges heat with the electronic device; and
guide the air to flow into the first chamber and the second chamber from one of the first vent and the other vent and guide the air to flow out of the mounting cavity from the other of the first vent and the other vent.

19. A wireless charger, comprising:
a lower shell, defining a first vent;
an upper shell, defining a second vent, connected to the lower shell, and cooperatively defining a mounting cavity with the lower shell; wherein the upper shell comprises a recessed portion configured to hold an electronic device with the second vent facing the electronic device, and the first vent is shielded by the upper shell in a thickness direction of the wireless charger;
a baffle, disposed in the mounting cavity and dividing the mounting cavity into a first chamber and a second chamber, wherein both the first vent and second vent are fluidly coupled to the first chamber, the first chamber is fluidly coupled to the second chamber, and a part of the housing defining the second chamber defines another vent fluidly coupled to the second chamber;
a coil module, disposed in the second chamber;
a circuit board, disposed in the second chamber and electrically connected to the coil module;
a plurality of electronic components, arranged on the circuit board at one side away from the coil module; and
a fan, disposed in the first chamber and configured to
guide air to flow into the first chamber from one of the first vent and the second vent and guide the air to flow out of the first chamber from the other of the first vent and the second vent; and
guide the air to flow into the first chamber and the second chamber from one of the first vent and the other vent and guide the air to flow out of the mounting cavity from the other of the first vent and the other vent.

\* \* \* \* \*